US006943800B2

(12) United States Patent
Taylor et al.

(10) Patent No.: US 6,943,800 B2
(45) Date of Patent: Sep. 13, 2005

(54) METHOD AND APPARATUS FOR UPDATING STATE DATA

(75) Inventors: Ralph C. Taylor, Delano, FL (US); Michael J. Mantor, Orlando, FL (US)

(73) Assignee: ATI Technologies, Inc., Thornhill (CA)

( * ) Notice: Subject to any disclaimer, the term of this patent is extended or adjusted under 35 U.S.C. 154(b) by 395 days.

(21) Appl. No.: 09/928,754

(22) Filed: Aug. 13, 2001

(65) Prior Publication Data

US 2003/0030643 A1 Feb. 13, 2003

(51) Int. Cl.[7] .............................................. G06F 12/02

(52) U.S. Cl. ....................... 345/543; 345/531; 345/556; 345/558; 345/538

(58) Field of Search ................................ 345/543, 531, 345/556, 558, 538, 418, 506, 553, 522, 552, 426, 537

(56) References Cited

U.S. PATENT DOCUMENTS 6,088,044 A * 7/2000 Kwok et al. ................ 345/505
6,268,874 B1 * 7/2001 Niu et al. ................... 345/506
6,525,737 B1 * 2/2003 Duluk et al. ................ 345/506

* cited by examiner

*Primary Examiner*—Matthew C. Bella
*Assistant Examiner*—Hau Nguyen
(74) *Attorney, Agent, or Firm*—Vedder, Price, Kaufman & Kammholz, P.C.

(57) ABSTRACT

In a graphics processing circuit, up to N sets of state data are stored in a buffer such that a total length of the N sets of state data does not exceed the total length of the buffer. When a length of additional state data would exceed a length of available space in the buffer, storage of the additional set of state data in the buffer is delayed until at least M of the N sets of state data are no longer being used to process graphics primitives, wherein M is less than or equal to N. The buffer is preferably implemented as a ring buffer, thereby minimizing the impact of state data updates. To further prevent corruption of state data, additional sets of state data are prohibited from being added to the buffer if a maximum number of allowed states is already stored in the buffer.

20 Claims, 3 Drawing Sheets

METHOD AND APPARATUS FOR UPDATING STATE DATA

TECHNICAL FIELD OF THE INVENTION

This invention relates generally to video graphics processing and, more particularly, to a method and apparatus for updating state data used in processing video graphics data.

BACKGROUND OF THE INVENTION

As is known, a conventional computing system includes a central processing unit, a chip set, system memory, a video graphics processor, and a display. The video graphics processor includes a raster engine and a frame buffer. The system or main memory includes geometric software and texture maps for processing video graphics data. The display may be a cathode ray tube (CRT) display, a liquid crystal display (LCD) or any other type of display. A typical prior art computing system of the type described above is illustrated in FIG. 1. As shown in FIG. 1, the system 100 includes a host 102 coupled to a graphics processor (or graphics processing circuit) 104 and main memory 108. The graphics processor 104 is coupled to local memory 110 and a display 106. The host 102 is responsible for the overall operation of the system 100. In particular, the host 102 provides, on a frame by frame basis, video graphics data to the display 106 for display to a user of the system 100. The graphics processor 104, which comprises the raster engine and frame buffer, assists the host 102 in processing the video graphics data. In a typical system, the graphics processor 104 processes three-dimensional (3D) processed pixels with host-created pixels in the local memory 110 of the graphics processor 104, and provides the combined result to the display 106.

To process video graphics data, particularly 3D graphics, the central processing unit executes video graphics or geometric software to produce geometric primitives, which are often triangles. A plurality of triangles is used to generate an object for display. Each triangle is defined by a set of vertices, where each vertex is described by a set of attributes. The attributes for each vertex can include spatial coordinates, texture coordinates, color data, specular color data or other data as known in the art. Upon receiving a geometric primitive, a transform and lighting engine (or vertex shader engine) of the video graphics processor may convert the data from 3D to projected two-dimensional (2D) coordinates and apply coloring and texture coordinate computations to the vertex data. Thereafter, the raster engine of the video graphics processor generates pixel data based on the attributes for one or more of the vertices of the primitive. The generation of pixel data may include, for example, texture mapping operations performed based on stored textures and texture coordinate data for each of the vertices of the primitive. The pixel data generated is blended with the current contents of the frame buffer such that the contribution of the primitive being rendered is included in the display frame. Once the raster engine has generated pixel data for an entire frame, or field, the pixel data is retrieved from the frame buffer and provided to the display.

As known in the art the concept of a state is a way of defining a related group of graphics primitives; that is, a set of primitives having a common attribute or need for a particular type of processing define a single state. For example, if an object to be rendered on a display comprises multiple types of textures, graphics primitives corresponding to each type of texture comprise a separate state. A given state may be realized through state data. For example, the DirectX 8.0 standard promulgated by Microsoft Corporation defines the functionality for so-called programmable vertex shaders (PVSs). A PVS is essentially a generic video graphics processing platform, the operation of which is defined at any moment according to state data.

Generally, in the context of programmable vertex shaders, state data may comprise either code data or constant data. Code state data generally comprises instructions to be executed by the programmable vertex shader when processing the vertices for a given set of primitives. Constant state data, on the other hand, comprises values used by the programmable vertex shader when processing the vertices for the given set of primitives. Regardless of these differences, both code state data and constant state data share the common characteristic that they remain unchanged during the processing of vertices within a given state.

The DirectX standard sets forth sizes for the memory or buffers used to store the code state data and constant state data. In particular, according to the DirectX standard, the code buffer comprises 128 words, whereas the constant buffer comprises 96 words. However, in a preferred embodiment, the constant buffer comprises 192 words. Regardless, each word in the code and constant buffers comprise 128 bits. Typically, however, a given state will not occupy the entire available buffer space in either the code buffer or constant buffer. Additionally, frequent changes in state require frequent updates of the state data stored in the code and constant buffers, thereby leading to delays when performing such updates. One way to mitigate these delays is to provide duplicate code and constant buffers such that, while one set of buffers is being used to process graphics primitives, state data may be loaded in parallel into the duplicate set of buffers. However, this solution obviously doubles the cost of the buffers despite the fact that a given set of state data typically fails to occupy the entire buffer in which it is stored. Thus, it would be advantageous to provide a technique that substantially reduces delays caused by updating of state data but that does not require the use of additional memory. In particular, such a technique should exploit the frequent availability of otherwise unused state data buffer space.

BRIEF DESCRIPTIONS OF THE DRAWINGS

SUMMARY OF THE INVENTION

The present invention provides a technique for maintaining and using multiple sets of state data in state-related buffers. In particular, up to N sets of state data are stored in a buffer such that a total length of the N sets of state data does not exceed the total length of the buffer. While stored in the buffer, at least one of the N sets of state data may be used to process graphics primitives. When it is desired to add an additional set of state data, it is first determined whether a length of the additional set of state data would exceed available space in the buffer. When the length of the additional set of state data would exceed the available space in the buffer, storage of the additional set of state data in the buffer is delayed until at least M of the N sets of state data are no longer being used to process graphics primitives, wherein M is less than or equal to N. The M sets of state data are preferably those sets of state data that would be at least partially overwritten by the additional set of state data. Where the buffer is implemented as a ring buffer, this technique allows state data to be continuously updated in a single buffer while minimizing the impact of state data updates. In another embodiment of the present invention, additional sets of state data are prevented from being added to the buffer if a maximum number of allowed states is already stored in the buffer. In this manner, the present invention ensures that state data will not be corrupted when additional state data is to be added to the buffer.

DETAILED DESCRIPTION OF THE PREFERRED EMBODIMENT

Figure 2:
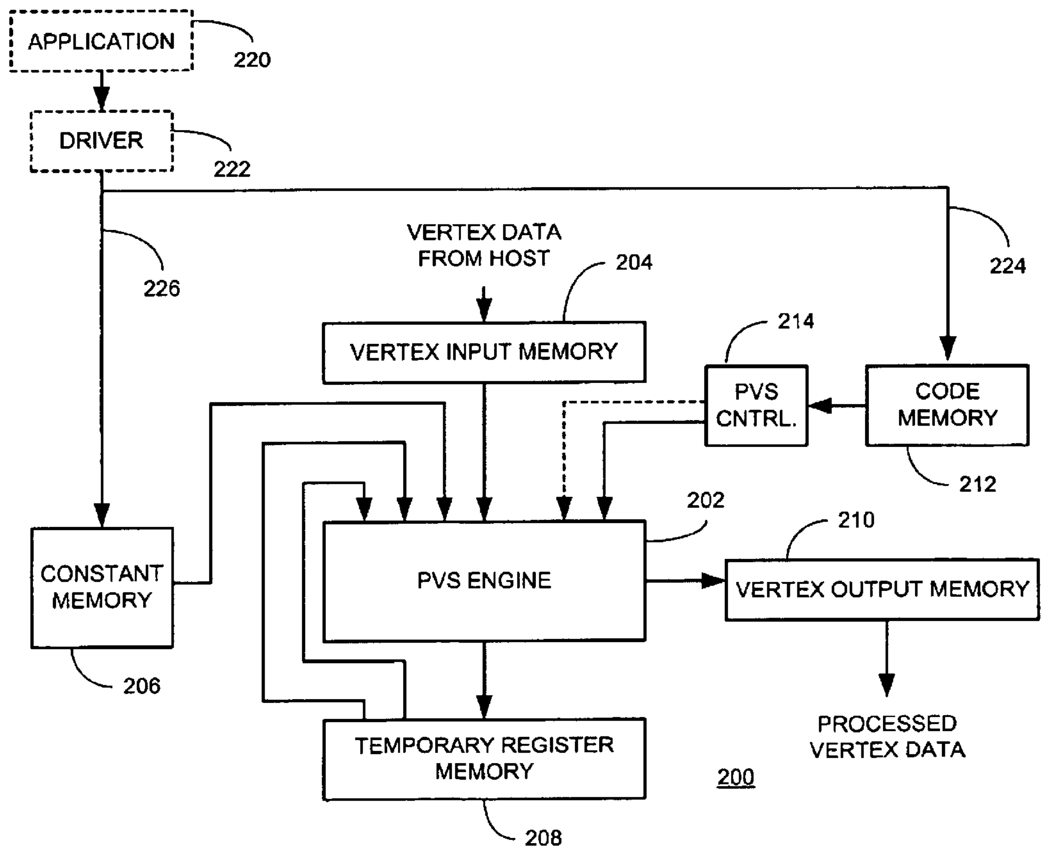
FIG. 2 is a block diagram of a programmable vertex shader in accordance with the present invention.

The present invention may be more fully understood with reference to FIGS. 2–7. Referring now to FIG. 2, a PVS 200 is illustrated comprising a programmable vertex shader engine 202 coupled to a vertex input memory 204, a constant memory 206, a temporary register memory 208, and a vertex output memory 210. Additionally, the PVS engine 202 is coupled to a code memory 212 via a PVS controller 214. Preferably, each of the blocks illustrated in FIG. 2 is implemented as part of a dedicated hardware platform. In general, the PVS 200 operates upon vertex data received from a host using state data also received from the host. Portions of such a host, including an application 220 and graphics processor driver 222, are also illustrated in FIG. 2. The application 220 typically comprises a computer-executed software program or programs that generate graphics data. The driver 222, in turn, controls the processing of such graphics data by a graphics processor. As known to those having ordinary skill in the art, the driver 222 is typically implemented as a software program. Further description of the operation of the driver 222 is provided below.

As known in the art, the vertex data comprises information defining attributes such as x, y, z and w coordinates, normal vectors, texture coordinates, color information, fog data, etc. Typically, the vertex data is representative of geometric primitives (i.e. triangles). A related group of primitives defines a given state. That is, state data comprises all data that is constant relative to a given set of primitives. For example, all primitives processed according to one set of textures define one state, while another group of primitives processed according to another set of textures define another state. Those having ordinary skill in the art can readily define a variety of other state-differentiating variables, other than texture, and the present invention is not limited in this regard.

In accordance with the present invention, state data comprises either code data or constant data. The code data takes the form of instructions or operation codes (op codes) selected from a predefined instruction or op code set. For example, code-based state data typically defines one or more operations to be performed on the vertices of a set of primitives. In this same vein, constant state data comprises values used in the operations performed by the code data upon the vertices of the graphics primitives. For example, constant state data may comprise values in transformation matrices used to rotate relative position data of a graphically displayed object.

Based on the state data provided by the host, the PVS engine 202 operates upon the graphics primitives. A suitable implementation for the PVS engine 202 (or computation module) is described in U.S. patent application Ser. No. 09/556,472, filed Apr. 21, 2000 and entitled "Vector Engine With Pre-Accumulator Buffer And Method Therefore", the teachings of which application are incorporated herein by this reference. In particular, the PVS engine 202 performs various mathematical operations including vector and scalar operations. For example, the PVS engine 202 performs vector dot product operations, vector addition operations, vector subtraction operations, vector multiply-and-accumulate operations, and vector multiplication operations. Likewise, the PVS engine 202 implements scalar operations, such as an inverse of x function, an $x^y$ function, an $e^x$ function, and an inverse of the square root of x function. Techniques for implementing these types of functions are well known in the art and the present invention is not limited in this regard. As shown in FIG. 2, the PVS engine 202 receives input operands from the vertex input memory 204, the constant memory 206 and the temporary register memory 208. As noted above, the PVS engine 202 receives instructions or op codes out of the code memory 212 via the PVS controller 214. Additionally, the PVS engine 202 receives control signals, illustrated as a dotted line in FIG. 2, from the PVS controller 214. The vertex output memory 210 receives output values provided by the PVS engine 202 based upon the execution of the instructions provided by the code memory 212 and the PVS controller 214.

The vertex input memory 204 represents the data that is provided on a per vertex basis. In a preferred embodiment, there are sixteen vectors (a vector is a set of x, y, z and w coordinates) of input vertex memory available. The constant memory 206 preferably comprises one hundred and ninety two vector locations for the storage of constant values. The temporary register memory 208 is provided for the temporary storage of intermediate values calculated by the PVS engine 202.

Figure 3:
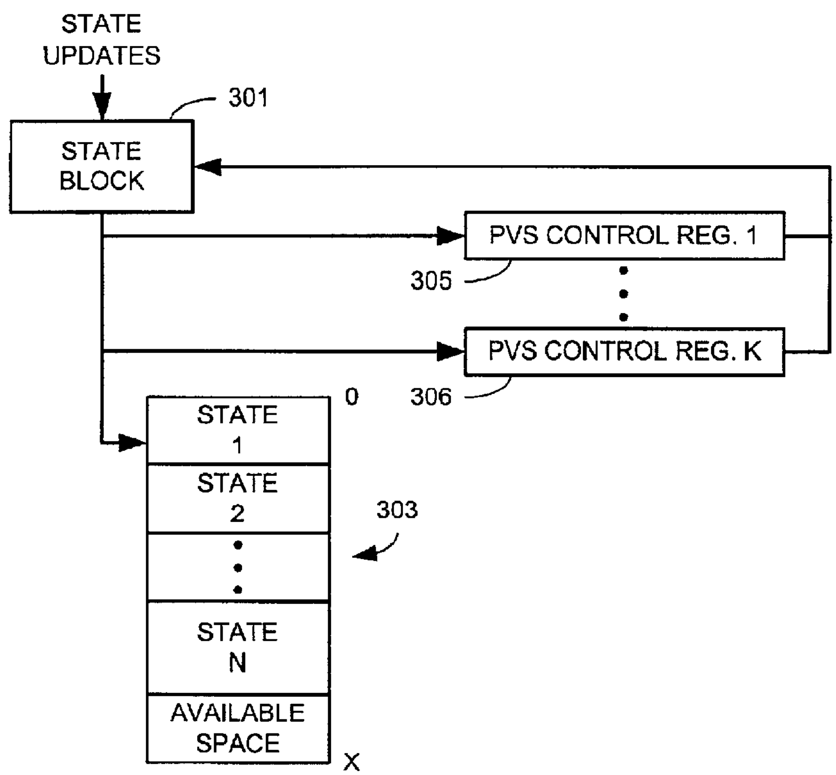
FIG. 3 is a block diagram illustrating provision of state data to a programmable vertex shader in accordance with the present invention.

Referring now to FIG. 3, a state block 301 is illustrated. The state block 301 comprises control functionality of the PVS embodied, in part, by the PVS controller 214 illustrated in FIG. 2. In general, the state block 301 controls the updating of state data in both the constant memory 206 and code memory 212. Operation of the state block 301, which is preferably implemented as a state machine as known in the art, is further described with reference to FIG. 7 below. As illustrated in FIG. 3, the state block 301 is coupled to a buffer 303 representative of either the constant memory 206 or code memory 212. It is understood, however, that the buffer 303 is representative of any buffer used to store state data, as that term is used in the context of the present invention. Additionally, the state block 301 is coupled to a plurality of programmable vertex shader control registers 305–306. The buffer 303 may be of any arbitrary length, X, but, in a preferred embodiment, the minimum size is dictated according to the DirectX standard.

As shown in FIG. 3, the buffer 303 comprises N sets of state data stored sequentially. An amount of available space is also illustrated in the buffer 303 and comprises locations in the buffer 303 not otherwise occupied by the N sets of state data. In a preferred embodiment, the buffer 303 is implemented as a ring buffer. Ring buffers are well known to those having ordinary skill in the art, and need not be described in further detail herein. Based on the example illustrated in FIG. 3, the PVS engine 202 can operate in accordance with any of the sets of state data, labeled 1 through N. Because any one of these sets of state data can be loaded while the PVS engine 202 is executing in accordance with another set of state data, the latencies encountered in prior art systems are avoided.

Each of the PVS control registers 305–306 preferably stores data (e.g., addresses of location within the buffer 303) indicative of a beginning and an ending of a corresponding set of state data in the buffer 303. Additionally, as described in greater detail below, the PVS control registers 305–306 allow the state block 301 to determine when a maximum number of allowed states is stored in the buffer 303. To this end, the number of PVS control registers 305–306 preferably corresponds to the maximum number of allowed states, in this example, K states. In this manner, the state block 301 may prevent additional sets of state data from being stored in the buffer 303 when the maximum number of allowed states has been reached.

Figure 4:
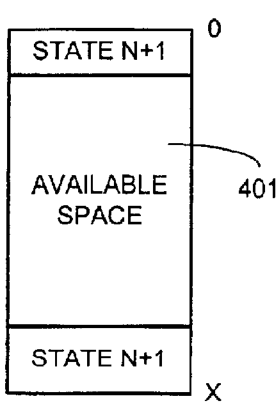
FIGS. 4–6 illustrate various embodiments for updating state data in a buffer in accordance with the present invention.
Figure 5:
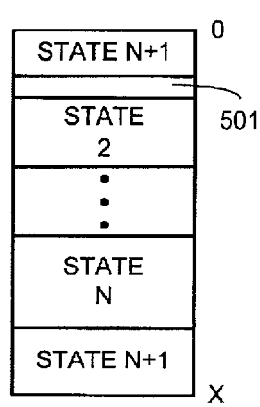
Figure 6:
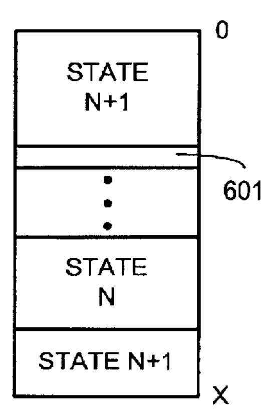

When a new set of state data is to be written into the buffer 303, various outcomes illustrated in FIGS. 4–6 may be achieved in accordance with the present invention. In particular, FIGS. 4–6 illustrate the contents of the buffer 303 when an additional set of state data, labeled N+1, has been written into the buffer. It is assumed in FIGS. 3–6 that no more than K sets of state data may be stored in the buffer 303, where $N+1 \leqq K$. It is also assumed in FIGS. 3–6 that a length of the data comprising state N+1 is greater than the available space illustrated in FIG. 3. As a result, it is necessary to wait until at least one previous set of state data is no longer being used to process graphics primitives thereby freeing up space for the additional state data.

Referring now to FIG. 4, an embodiment of the present invention is illustrated in which the additional set of state data is written into the buffer 303 only after all of the previous sets of state data are no longer in use. Note that, given the ring buffer nature of the buffer 303, state N+1 is stored beginning at the first available location in the buffer after the last location where state N was previously stored. Thereafter, a block of available space 401 may be used to store subsequent sets of state data. When the amount of available space has been subsequently reduced to a point where additional sets of state data may no longer fit, the process of waiting for the previous sets of state data to no longer be in use is repeated. FIG. 4 also illustrates the ring buffer nature of the buffer 303 in that the data for state N+1 wraps around from the end of the buffer to the beginning of the buffer. Using such a ring buffer implementation, the buffer 303 may be continuously updated with additional state data as described herein.

FIGS. 5 and 6 illustrate another embodiment of the present invention in which those previous states that would otherwise be overwritten by the additional set of state data are overwritten by the additional set of state data when those previously-stored states are no longer being used to process graphics data. Referring to FIG. 5, a scenario is illustrated in which the data for state N+1, if added to the buffer, would overwrite at least a portion of the state data corresponding to state 1. In this embodiment, the data for state N+1 is written into the buffer only after the data for state 1 is no longer in use. State data is no longer in use when the last vertex of the last primitive associated with a particular state is done using state data and that set of state data is de-allocated. In general, when a set of state data (for example, comprising as little as zero state constant locations to all of the state constant locations) is loaded followed by a primitive buffer, that set of state data is locked until the primitives of that buffer are done using it. As described in greater detail below, a flush command can be issued by the host to the PVS that forces the PVS to complete the processing (based on the currently stored state data) of all remaining primitives in the input memory before accepting any additional state data. Regardless, and referring again to FIG. 5, the data for state N+1 at least partially overwrites the space previously occupied by state 1. As a result, a new set of available space 501 is now available for the storage of subsequent sets of state data.

FIG. 6 illustrates an additional example of this embodiment in which the data for state N+1, if added to the buffer 303, would overwrite all of the data for state 1 and at least a portion of the data for state 2. In this case, the data for state N+1 would only be written to the buffer after the data for state 1 and state 2 are no longer in use. At that time, the data for state N+1 would be added to the buffer 303 resulting in a new set of available space 601 as shown.

Figure 1:
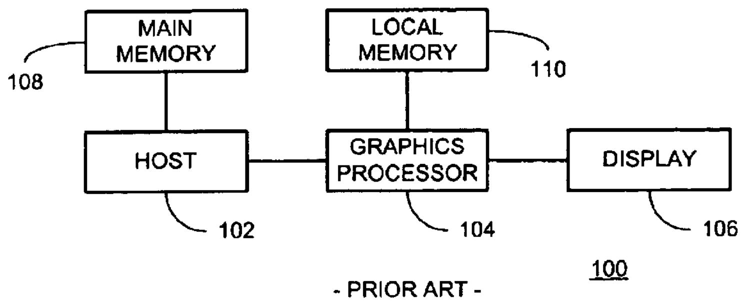
FIG. 1 is a block diagram of a computing system in accordance with the prior art.
Figure 7:
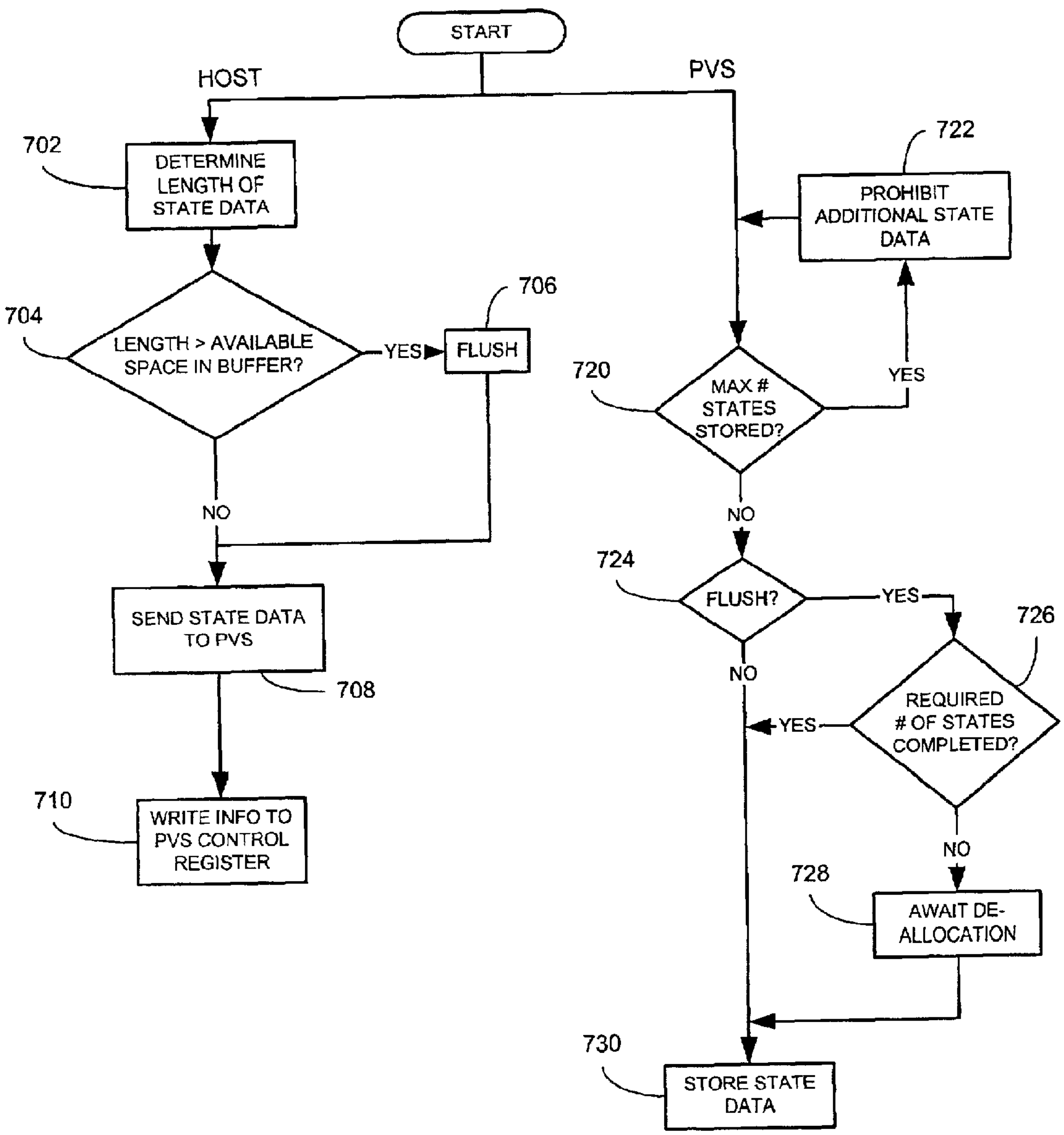
FIG. 7 is a flow chart illustrating operation of a state data source and a programmable vertex shader in accordance with the present invention.

Referring now to FIG. 7, there is illustrated a flow chart describing operation of the present invention. In particular, two parallel paths of processing are illustrated in FIG. 7. On the left, comprising blocks 702–710, processing implemented by a host (state data source) is shown. In a preferred embodiment, the state data source is embodied by a computer-implemented application providing data to a driver that, in turn, provides the state data to the programmable vertex shader. All processing of vertices for a given set of primitives is also initiated by the computer-implemented application and driver. The driver is preferably implemented as instructions stored in virtually any type of computer-readable memory, such as memory 108 in FIG. 1. On the right of FIG. 7, processing performed by a programmable vertex shader is illustrated by blocks 720–730.

At block 702, it is assumed that a new set of state data is available to be sent to the programmable vertex shader. As described above, a host-implemented application works through a driver to send state data and vertex data to a graphics processor. In practice, the vertex data may be indirectly fetched via direct memory access (DMA) from the host's main memory or from the graphic processor's local memory, but data synchronizing the state data to the vertex data is in the same stream as the state data. That is, when the driver sends a first set of data to the PVS, it starts with all the state data the PVS needs to process a set (buffer) of primitives, and then the driver either sends the primitive data itself or a "trigger" that causes the vertex data to be fetched via DMA requests. An additional set of state data, if any, can be subsequently sent. If the first set of vertex data is being accessed via DMA, the additional (second) set of state data can be loaded in parallel to vertex data fetch and processing without waiting for a first set of vertex data to be sent to the PVS. Alternatively, if the first set of vertex data is sent in-stream (i.e., not via DMA), then the additional set of state data can be loaded after the primitive data is sent, still in parallel with the processing of the first set of vertex data.

Referring again to FIG. 7, a length of the additional set of state data is determined at block 702. In this context, a length of a set of state data is a number of full words (or individually-accessible storage locations) in the buffer that would be occupied by the additional set of state data. Techniques for determining such lengths are well known in the art. At block 704, it is determined whether the length of the state data to be added to the buffer is greater than the available space in the buffer. To this end, the state data source (e.g., the driver) has knowledge of the length of the buffer and the collective length of the states currently stored and in use in the buffer. The state data source adds the length of the additional set of state data to the collective length of the currently stored sets of state data and compares the resulting sum to the known length of the buffer. If the sum is less than the known buffer length, then the difference between the two is the amount of available space in the buffer.

If, however, the sum is greater than the known buffer length, processing continues at step 706 where the state data source requests that the state data in the buffer be flushed. A flush command is a special type of state data that forces the state block to wait until the PVS has processed all primitives corresponding to one or more of the current sets of state data before accepting any additional state data. In a preferred embodiment, a flush command requires that processing based on all sets of currently stored state data be completed before accepting additional sets of state data. However, a more generalized flush command could be implemented. That is, where N sets of state data are currently stored in the buffer, and if the additional set of state data would overwrite M sets of state data (where $M \leqq N$), those having ordinary skill in the art will recognize that the flush command could be implemented to cause the PVS to accept the additional set of state data only after the M sets of state data that would otherwise be overwritten are no longer in use. This would provide a greater degree of control at the expense of implementation complexity.

Furthermore, a flush command may be sent to the PVS at any time prior to overwriting currently-stored state data in a state data buffer. That is, if it is determined that an additional set of state data would prematurely overwrite a portion of the state data buffer, the flush command could be sent before any of the additional sets of state data is sent. Alternatively, an amount of the additional set of state data not exceeding the currently available space in the buffer could be first sent to the PVS for storage in the buffer. Then, at any time prior to overwriting a currently-used state data buffer location, the flush command could be sent thereby preventing any subsequent writes to the state data buffer until the requisite number of state data sets are no longer being used. Thereafter, the remaining portion of the additional set of state data could be stored in the buffer. In this manner, the delay associated with loading the additional set of state data could be reduced even further.

Regardless, after the flush operation has been issued, or if a sufficient amount of available space was determined at block 704, processing continues at block 708 where the state data source sends the additional state data to the programmable vertex shader. Note that during the host-implemented processing of blocks 702 and 704, the PVS continues processing graphics primitives based on the previously-stored state data. Due to this parallel processing of additional state data and previously-stored state data, the present invention avoids the latencies encountered in prior art solutions. At block 710, the state data source writes, to the PVS control registers, the appropriate information corresponding to the additional set of state data. Preferably, such information comprises indications of a beginning and end of the additional state data within the state data buffer. Because state data buffers in accordance with the present invention are preferably implemented as ring buffers, it is possible that the end of given set of state data has a buffer address that is in fact lower than the beginning of the given set of state data, indicating that the given set of state data wraps around the end of the buffer.

As mentioned above, the PVS continues processing primitives in parallel with the processing of blocks 702–710. Furthermore, in another embodiment of the present invention, the PVS also prevents more than a maximum number of sets of state data from being stored in a state data buffer. This is illustrated along the right-hand side of FIG. 7. If, at block 720, it is determined that a maximum number of states have already been stored in a given state data buffer, processing continues at block 722 where the programmable vertex shader refuses to accept additional state data from the state data source until at least one of the sets of currently-stored state data is no longer in use, thereby reducing the number of states stored in the buffer to less than the maximum number of states allowed. Those having ordinary skill in the art will recognize numerous methods are available for determining the number of states currently stored in the buffer. In practice, the state data source also keeps track of the number of currently stored sets of state data, and therefore also has knowledge of when the maximum number of sets of state data have been stored.

When it is determined that a less than the maximum number of states are currently stored in the buffer, processing continues at block 724 where it is determined whether a flush command has been encountered. Note that the decisions of blocks 720 and 724 have been illustrated in a serial fashion for convenience of explanation. That is, although the decisions of blocks 720 and 724 have been illustrated in FIG. 7 as occurring in a specific order, in practice, the decisions illustrated by blocks 720 and 724 may occur asynchronously relative to each other. If a flush command has been received, processing continues at step 726 where it is determined whether the number of sets of state data required to satisfy the flush command are no longer being used. For example, in the preferred embodiment, the flush command requires that all currently stored states be completed. However, as described above, a more flexible flush command may be implemented in which the particular number of sets of state data to be completed may be specified. Regardless, if the required number of sets of state data are not completed (i.e., they are still in use), processing continues at block 728 where the PVS awaits deal-location of the required number of sets of state data. Once de-allocation has occurred, or where a flush command is not encountered, processing continues at block 730 where the state data is written to the buffer.

The present invention substantially overcomes the problem of updating state data without incurring latencies in processing of graphics data. To this end, buffers used to store state data are implemented as ring buffers, thereby allowing multiple sets of state data to be stored in each buffer. While processing graphics primitives according to previously-stored state data, the present invention allows additional sets of state data to be stored into the buffer substantially simultaneously, thereby minimizing latencies. The foregoing description of a preferred embodiment of the invention has been presented for purposes of illustration and description, it is not intended to be exhaustive or to limit invention to the precise form disclosed. The description was selected to best explain the principles of the invention and practical application of these principles to enable others skilled in the art to best utilize the invention and various embodiments, and various modifications as are suited to the particular use contemplated. For example, it is anticipated that the present invention may be equally applied to pixel shaders or other processing that relies on state data to operate upon pipelined data. Thus, it is intended that the scope of the invention not be limited by the specification, but be defined by the claims set forth below.

We claim:

1. In a computer system comprising a host in communication with a graphics processor, a method for the graphics processor to store state data in a buffer residing in the graphics processor, the method comprising:

receiving and storing N sets of state data in the buffer, the buffer being a non-duplicative state data buffer, where the total length of the N sets of state data does not exceed a length of the buffer, and wherein at least one set of the N sets of state data is used to process graphics primitives; and prohibiting an additional set of state data from being stored in the buffer when N equals a maximum number of allowed states.

2. The method of claim 1, wherein the maximum number of allowed states is two.

3. The method of claim 1, further comprising:

determining that M sets of state data of the N sets of state data are no longer being used to process the graphics primitives before writing the additional set of state data to the buffer, wherein M≦N; and permitting the additional set of state data to be stored in the buffer when the M sets of state data are no longer being used to process the graphics primitives.

4. The method of claim 1, wherein the buffer comprises either a code buffer or a constant buffer.

5. In a computer system comprising a host in communication with a graphics processor, a method for the host to update state data in a buffer residing in the graphics processor, the method comprising:

writing N sets of state data to the buffer, where the total length of the N sets of state data does not exceed a length of the buffer, the buffer being a non-duplicative state data buffer, and where at least one set of the N sets of state data is used to process graphics primitives;

determining whether a length of an additional set of state data would exceed available space in the buffer; and when the length of the additional set of state data exceeds the available space in the buffer, waiting until M sets of state data of the N sets of state data are no longer being used to process the graphics primitives before writing the additional set of state data to the buffer, wherein M≦N and each of the M sets of state data would be at least partially overwritten by the additional set of state data.

6. The method of claim 5, wherein the buffer is a ring buffer and the available space in the buffer is the difference between the length of the buffer and the total length of the N sets of state data.

7. The method of claim 5, wherein N is two.

8. The method of claim 7, wherein waiting further comprises waiting until all N sets of state data are no longer being used to process the graphics primitives.

9. The method of claim 5, wherein waiting further comprises sending a flush command to the graphics processor that causes the graphics processor to refuse the additional set of state data until at least one set of the N sets of state data is no longer being used to process the graphics primitives.

10. The method of claim 5, wherein the buffer comprise either a code buffer or a constant buffer.

11. A computer-readable medium having stored thereon computer-executable instructions for performing the method of claim 5.

12. The computer-readable medium of claim 11, wherein the computer-readable instructions are embodied in a graphics processing driver residing in the host.

13. A graphics processing circuit comprising:

means for receiving and storing N sets of state data in the buffer, the buffer being a non-duplicative state data buffer, where the total length of the N sets of state data does not exceed a length of the buffer, and wherein at least one set of the N sets of state data is used to process graphics primitives; and means for prohibiting an additional set of state data from being stored in the buffer when N equals a maximum number of allowed states.

14. The apparatus of claim 13, wherein the maximum number of allowed states is two.

15. The apparatus of claim 13, further comprising:

means for determining that M sets of state data of the N sets of state data are no longer being used to process the graphics primitives, wherein M≦N; and means for permitting the additional set of state data to be stored in the buffer when the M sets of state data are no longer being used to process the graphics primitives.

16. In a computer systems comprising a host that provides graphics via a display, wherein the host is in communication with a graphics processor to assist in processing of the graphics, a host-implemented apparatus for updating state data in a buffer residing in the graphics processor, the apparatus comprising:

means for writing N Sets of state data to the buffer, the buffer being a non-duplicative state data buffer, where the total length of the N sets of state data does not exceed a length of the buffer, and where at least one set of the N sets of state data is used to process graphics primitives to be displayed on the display;

means for determining whether a length of an additional set of state data would exceed available space in the buffer; and means, coupled to the means for determining, for waiting until M sets of state data of the N sets of state data are no longer being used to process the graphics primitives before writing the additional set of state data to the buffer when the length of the additional set of state data exceeds the available space in the buffer, wherein M≦N and each of the M sets of state data would be at least partially overwritten by the additional set of state data.

17. The apparatus of claim 16, wherein the buffer is a ring buffer and the available space in the buffer is the difference between the length of the buffer and the total length of the N sets of state data.

18. The apparatus of claim 16, wherein N is two.

19. The apparatus of claim 18, wherein the means for waiting waits until all N sets of state data are no longer being used to process the graphics primitives.

20. In a computer system comprising a host in communication with a graphics processor, a method for the graphics processor to store state data in a buffer residing in the graphics processor, the method comprising:

receiving and storing N sets of state data in the buffer, where the total length of the N sets of state data does not exceed a length of the buffer, and wherein at least one set of the N sets of state data is used to process graphics primitives and wherein the buffer is a ring buffer and the available space in the buffer is the difference between the length of the buffer and the total length of the N sets of state data; and prohibiting an additional set of state data from being stored in the buffer when N equals a maximum number of allowed states.

* * * * *